(12) United States Patent
Van Der Vegte et al.

(10) Patent No.: US 9,399,314 B2
(45) Date of Patent: Jul. 26, 2016

(54) PROCESS FOR PREPARING INJECTION MOLDED PARTS WITH DECREASED GLASS FIBER READ OUT

(75) Inventors: Eric Willem Van Der Vegte, AH Buchten (NL); Johannes Hoekstra, AX Lieshout (NL); Rudy Rulkens, CE Margraten (NL)

(73) Assignee: DSM IP ASSETS B.V., Heerlen (NL)

( * ) Notice: Subject to any disclaimer, the term of this patent is extended or adjusted under 35 U.S.C. 154(b) by 688 days.

(21) Appl. No.: 13/203,522

(22) PCT Filed: Feb. 8, 2010

(86) PCT No.: PCT/EP2010/051487
§ 371 (c)(1),
(2), (4) Date: Nov. 8, 2011

(87) PCT Pub. No.: WO2010/100009
PCT Pub. Date: Sep. 10, 2010

(65) Prior Publication Data
US 2012/0043700 A1 Feb. 23, 2012

(30) Foreign Application Priority Data
Mar. 4, 2009 (EP) .................................... 09154347

(51) Int. Cl.
C08K 3/40 (2006.01)
B29C 45/00 (2006.01)
B29K 77/00 (2006.01)
B29K 105/12 (2006.01)

(52) U.S. Cl.
CPC ......... B29C 45/0005 (2013.01); *B29K 2077/00* (2013.01); *B29K 2105/12* (2013.01)

(58) Field of Classification Search
CPC ........... B29C 45/0005; B29K 2077/00; B29K 2105/12
USPC .............................................. 264/331.12, 241
See application file for complete search history.

(56) References Cited

U.S. PATENT DOCUMENTS

| | | | |
|---|---|---|---|
| 4,335,038 | A | 6/1982 | Thomas |
| 5,112,908 | A | 5/1992 | Epstein |
| 6,191,207 | B1 | 2/2001 | Fujii et al. |
| 2001/0047050 | A1 | 11/2001 | Oyamada et al. |
| 2002/0019182 | A1 | 2/2002 | Ishibashi et al. |
| 2002/0103287 | A1* | 8/2002 | Koning et al. ................ 524/494 |
| 2003/0104218 | A1* | 6/2003 | Tsai et al. .................. 428/423.5 |
| 2003/0158308 | A1 | 8/2003 | Nay et al. |
| 2006/0155066 | A1* | 7/2006 | Crevecoeur et al. .......... 525/178 |
| 2008/0167415 | A1* | 7/2008 | Stoeppelmann et al. ..... 524/494 |
| 2009/0131569 | A1* | 5/2009 | Schwitter et al. ............. 524/423 |
| 2010/0227122 | A1* | 9/2010 | Kumazawa et al. .......... 428/156 |

FOREIGN PATENT DOCUMENTS

| | | |
|---|---|---|
| DE | 4321247 | 1/1994 |
| EP | 0 272 695 | 5/1988 |
| EP | 0872521 | 10/1998 |
| EP | 0957131 | 11/1999 |
| EP | 2020282 | 2/2009 |
| JP | 10120900 | 5/1998 |
| JP | 11071518 | 3/1999 |
| JP | 2000-154316 | 6/2000 |
| JP | 2002-47412 | 2/2002 |
| KR | 1991-0008746 | 10/1991 |
| KR | 1999-0077036 | 10/1999 |
| WO | WO 0240591 | 5/2002 |

OTHER PUBLICATIONS

Poel et al., "High performance differential scanning calorimetery (HPer DSC): A powerful analytical tool for the study of the metastability of polymers", thermochimica acta 461 (Apr. 2007) 107-121.*
Arvanitoyannis I, et al., "Composites of Anionic (Co) Polyamides (Nylon 6/Nylon12) with Short Glass E-Fibers. Preparation and Properties", Journal of Applied Polymer Science, John Wiley and Sons Inc., New York, US, vol. 51, No. 11, Mar. 14, 1994, pp. 1883-1899.
International Search Report for PCT/EP2010/051487, mailed Apr. 15, 2010.
Written Opinion for PCT/EP2010/051487, mailed Apr. 15, 2010.
Tol, R.T. et al, "*Confined crystallization phenomena in immiscible polymer blends . . .*", Polymer 46 (2005) 2966-2977.

* cited by examiner

*Primary Examiner* — Galen Hauth
(74) *Attorney, Agent, or Firm* — Nixon & Vanderhye P.C.

(57) ABSTRACT

The present invention relates to a process for preparing an injection molded part, comprising the following steps: a preparing a glass fiber reinforced polyamide-6 composition with a relative viscosity of less than 2.4; b heating a such composition to obtain a viscous liquid; c filling a mold cavity with the viscous liquid with a filling time of at least 0.8 s; d leaving the viscous liquid in the mold under pressure until it cools to form a part; e opening the mold; f ejecting the part; wherein the polyamide-6 composition has a crystallization temperature under hyper DSC conditions of less than 168° C. The invention also relates to an injection molded part a having a maximum wall thickness of at least 2.5 mm; and/or b a part weight of at least 100 g per injection point; wherein the part consists of a glass fiber reinforced semi-crystalline polyamide-6 composition having a relative solution viscosity of less than 2.4, wherein the polyamide-6 composition has a crystallization temperature under hyper DSC conditions of less than 168° C.

18 Claims, No Drawings

PROCESS FOR PREPARING INJECTION MOLDED PARTS WITH DECREASED GLASS FIBER READ OUT

This application is the U.S. national phase of International Application No. PCT/EP2010/051487 filed 8 Feb. 2010 which designated the U.S. and claims priority to EP 09154347.0 filed 4 Mar. 2009, the entire contents of each of which are hereby incorporated by reference.

This invention relates to a process for preparing an injection molded part, comprising the following steps:
   a. preparing a glass fiber reinforced polyamide-6 composition with a relative viscosity of less than 2.4;
   b. heating such composition to obtain a viscous liquid;
   c. filling a mold cavity with the viscous liquid;
   d. leaving the viscous liquid in the mold under pressure until it cools to form a part;
   e. opening the mold;
   f. ejecting the part.

A disadvantage of such process for preparing an injection molded part is that glass fiber read out may occur, which is undesired. "Glass fiber read out" is here understood to be a surface showing protruding contours of glass fibers which are located immediately below the surface of a panel.

In the prior art, several solutions are known to decrease glass fiber read out. U.S. Pat. No. 4,664,862 relates to a method of producing glass fiber mat reinforced plastics panels without fiber read out defect. This is accomplished by adjusting the surface of the mold interior by etching equally spaced, closely packed minute pockets or valleys of truncated pyramid shape. This has the disadvantage that the interior of the mold has to be treated to avoid fiber read out and that a surface with a texture is obtained.

Another method in reducing glass fiber readout is described in U.S. Pat. No. 5,009,821, in which the mold cavity contains a surface finishing film substantially conformed to the surface of the mold cavity, after which the mold is injected. This has the advantage that the surface of the mold does not have to be etched, but an extra step is necessary to avoid fiber readout, as the mold has to have a finishing film before it can be injected.

It is an object of the present invention to decrease the glass fiber read out in a process for preparing an injection molded part comprising the following steps:
   a. preparing a glass fiber reinforced polyamide-6 composition with a relative viscosity of less than 2.4;
   b. heating such composition to obtain a viscous liquid;
   c. filling a mold cavity with the viscous liquid;
   d. leaving the viscous liquid in the mold under pressure until it cools to form a part;
   e. opening the mold;
   f. ejecting the part,
without having to adjust the mold.

This has surprisingly been achieved when the polyamide-6 composition has a crystallization temperature of less than 168° C. under hyper differential scanning calorimetry (hereafter: DSC) conditions.

It has surprisingly been found that the method for preparing an injection molded part according to the invention results in reduced glass fiber read out, without having to increase the cycling time of the injection molding process.

The injection molded part obtained according to the process of this invention clearly shows decreased glass fiber read out, as is exemplified by the examples.

Injection molded parts are here understood to be parts of which the mold cavity was completely filled and to which holding-pressure was applied after the injection phase and before opening of the mold.

Polyamide-6 composition is here understood to be a composition in which at least 30 wt % consists of polyamide-6, with respect to the total amount of composition and at least 50 wt % of polyamide-6 with respect to the total amount of polyamide in the composition.

Maximum wall thickness is here defined as measured by the so-called sphere method. This method uses an imaginative rolling sphere to calculate the wall thickness of an injection molded part. An imaginary sphere is made at a point of thickness measurement and is expanded until it interferes with any boundary of the part. The maximum wall thickness is thus equal to the diameter of the largest fitting sphere that does not cross a boundary of a part.

The method of determining the crystallization temperature under hyper DSC conditions is illustrated in the Examples.

The method of determining the relative solution viscosity is also illustrated in the Examples.

As a rule, the polyamide-6 composition has a crystallization temperature under hyper DSC conditions of at least 143° C.

The injection molded part prepared according to the process of the invention consists of a glass fiber reinforced semi-crystalline polyamide-6 composition characterized by a relative solution viscosity of 2.4 and a crystallization temperature under hyper DSC conditions of less than 168° C. The polyamide-6 composition preferably has a relative solution viscosity of less than 2.3, more preferably less than 2.2. The lower the relative solution viscosity, the lower the cycling time is. Such a polyamide-6 composition is preferably obtained by melt-mixing glass fibers, a base polyamide and preferably a low-molecular weight polyamide and optionally other components of the composition.

The polyamide-6 composition preferably comprises a base polyamide and a low-molecular weight polyamide, more preferably the polyamide-6 composition comprises at least 80-99.5 wt % of a base polyamide and 0.5-20wt % of a low-molecular weight polyamide in which the total amount is 100%.

Base polyamide is here understood to be polyamide-6.

Preferably, the base polyamide has a weight-average molecular weight of at least 10.000 g/mol and the low-molecular weight polyamide has a weight-average molecular weight of at most 5.000 g/mol.

More preferably, the composition comprises a base polyamide with a molecular weight of at least 15,000 g/mol and a low-molecular weight polyamide with a molecular weight of at most 4,000 g/mol.

The composition preferably comprises a low-molecular weight polyamide, being preferably an oligomer. This oligomer is a low-molecular weight polyamide having a weight-average molecular weight that is preferably at most 5,000 g/mol, preferably at most 4,000 g/mol, more preferably at most 3,000 g/mol. Preferably the weight-average molecular weight is greater than approximately 1,000 g/mol.

In one embodiment, the polyamide-6 composition comprises a low-molecular weight polyamide that has a melting point higher than the melting point of the base polyamide.

In another embodiment, the polyamide-6 composition comprises a low-molecular weight polyamide that has a melting point lower than the melting point of the base polyamide.

Suitable low-molecular weight polyamides are those that result upon melt-mixing with the other components of the polyamide-6 composition in a crystallization temperature of less than 168° C. under hyper DSC conditions. In one embodiment the low-molecular weight polyamide comprises at least 90 wt % repeating units of —[NH—(CH2)$_n$—NH—CO—(CH$_2$)$_4$—CO]— where n is preferably 4 or 6, and more preferably 4, and up to 10 wt % of a comonomer, preferably caprolactam. In another embodiment, the low-molecular weight polyamide is a PA66 oligomer. Mixtures of these low-molecular weight polyamides may also be applied.

The polyamide-6 composition comprises at least 10 wt % glass fibers, preferably at least 20 wt %, more preferably at least 30 wt % and most preferred at least 40 wt % with respect to the total composition. The more glass fibers are present the stiffer the material is. Usually at most 60 wt % of glass fibers are used. A polyamide-6 composition that is highly filled, i.e. including at least 30 wt % of glass fibers, also shows decreased glass fiber read out when the crystallization temperature is less than 168° C. under hyper DSC conditions. The glass fibers are preferably coated with a suitable sizing for polyamide-6 compositions, for example a sizing based on a silane compound. This improves their adhesion to the polyamide-6 composition.

Various other types of reinforcing compounds can be used in the polyamide-6 compositions, e.g. minerals (such as talc, wollastonite, kaolin), and fibers other than glass fibers. A wide variety of fibers can be used, both with respect to their dimensions and their chemical composition. Fibers having suitable dimensions are fibers with an average aspect ratio (ratio of length to diameter) in the polyamide-6 composition of between 5 and 100 and a diameter of between 1 and 20 microns, preferably between 8 and 15 microns. Suitable types of fibers include both natural and man-made fibers, such as carbon, mineral, polymer fibers. Suitable polymer fibers are e.g. polyaramid fibers. Also these fibers are preferably coated with a suitable sizing in order to improve their adhesion to the polyamide-6 composition.

The polyamide-6 composition optionally includes additives such as impact modifiers, mold release agents, stabilizers, nucleating agents and colorants. Suitable colorants include carbon black and black polyaniline derivatives, such as nigrosine. The polyamide-6 composition preferably comprises a black polyaniline derivative, and more preferably nigrosine as black polyaniline derivatives, e.g. nigrosine, lead to a decreased glass fiber read out.

When the mold is textured, the problem of glass fiber read is even more pronounced. Employing a polyamide-6 composition that has a crystallization temperature of less than 168° C. under hyper DSC conditions surprisingly also here decreases fiber read out.

The polyamide-6 composition can be obtained by melt-mixing the components by any known method. For instance the components may be dry blended and consequently fed into a melt mixing apparatus, preferably an extruder. Also the components can be directly fed into a melt mixing apparatus and dosed together or separately. Preference is given to an extruder as melt mixing apparatus. In that case the composition is obtained in pellets that can be used for further processing, for instance in injection molding.

The invention also relates to an injection molded part
a. having a maximum wall thickness of at least 2.5 mm; and/or
b. a part weight of at least 100 g per injection point;
wherein the part consists of a glass fiber reinforced semi-crystalline polyamide-6 composition having a relative solution viscosity of less than 2.4. These injection molded parts usually exhibit glass fiber read out, as the filling time required for these parts is usually long, e.g. at least 0.8 sec. It is thus an object of the present invention to provide injection molded parts with decreased glass fiber read out.

Surprisingly it has been found that if the glass fiber reinforced semi-crystalline polyamide-6 composition has a crystallization temperature under hyper DSC conditions of less then 168° C., is employed, less glass fiber read out is observed.

The injection molded part has a part weight of at least 100 g per injection point. Injection point is understood to be a point at which a mold cavity is filled with the viscous liquid in step b). Weight per injection point is here understood to be the total weight of a part, divided by the number of injection points. More preferably the weight of the injection molded part is at least 150 g per injection point, even more preferably at least 200 g per injection point. Generally speaking, the higher the part weight of the injection molded part per injection point, the longer the filling time is of the mold cavity. Longer filling times usually result in more glass fiber read out. Injections molded parts according to the invention exhibit less glass fiber read out.

The invention is illustrated by the following examples, without being limited thereto.

EXAMPLES 1-6 AND COMPARATIVE EXAMPLES A-F

The following compositions with a crystallization temperature of less than 168° C. under hyper DSC conditions were made:
Composition 1:
A composition comprising of 30 wt % glass fiber reinforcement, polyamide 6, mold release agent, impact modifier, nigrosine and PA66 oligomer was produced on a co-rotating twin screw extruder. The composition has a crystallization temperature under hyper DSC conditions of 160±5° C. and a relative solution viscosity of 2.05±0.1;
Composition 2:
A composition comprising of 50 wt % glass fiber reinforcement, polyamide 6, mold release agent, nigrosine and PA66 oligomer was produced on a co-rotating twin screw extruder. The composition has a crystallization temperature under hyper DSC conditions of 160±5° C. and a relative solution viscosity of 2.05±0.1;
Composition 3:
A composition comprising of 35 wt % glass fiber reinforcement, polyamide 6, mold release agent, nigrosine and PA66 oligomer was produced on a co-rotating twin screw extruder. The composition has a crystallization temperature under hyper DSC conditions of 160±5° C. and a relative solution viscosity of 2.05±0.1.

These compositions 1-3 were used in the Examples 1-6 to obtain injection molded parts as specified in Table 1.

The following compositions were made with a crystallization temperature higher than 168° C. under hyper DSC conditions:
Composition A:
A composition comprising of 30 wt % glass fiber reinforcement, polyamide 6, mold release agent, impact modifier, nigrosine and PA46 oligomer was produced on a co-rotating twin screw extruder. The composition has a crystallization temperature under hyper DSC conditions of 173±5° C. and a relative solution viscosity of 2.05±0.1;
Composition B:
A composition comprising of 50 wt % glass fiber reinforcement, polyamide 6, mold release agent, nigrosine and PA46 oligomer was produced on a co-rotating twin screw extruder. The composition has a crystallization temperature under hyper DSC conditions of 173±5° C. and a relative solution viscosity of 2.05±0.1;

Composition C:

A composition comprising of 35 wt % glass fiber reinforcement, polyamide 6, mold release agent, nigrosine and PA46 oligomer was produced on a co-rotating twin screw extruder. The composition has a crystallization temperature under hyper DSC conditions of 173±5° C. and a relative solution viscosity of 2.05±0.1.

These compositions A-C were used in the Comparative Examples A-F to obtain injection molded parts as specified in Table 1.

DSC measurements were conducted with a Perkin Elmer HPer DSC Pyris 1. The crystallization temperature under hyper DSC conditions was determined by heating the sample from room temperature to 260° C. at a rate of 150° C./min; subsequently maintaining the sample at 260° C. for 5 minutes to erase its thermal history, after which the crystallization temperature was measured at a cooling rate of 150° C./min.

Relative solution viscosity was measured in 90% formic acid at a temperature of 25° C. according to ISO307, with the exception that the concentration of the polyamide was 0.01 g/ml.

In table 1, the various parameters are shown, together with an indicator of the amounts of glass fiber read out. The following indicators are used: (−) poor, major GF read-out spots, (+) acceptable, minor GF read-out, (++) good, hardly any GF read-out (+++) very good, no GF read-out. All molded parts had one injection point.

TABLE 1

| Part (black colored) | Filling time [s] | Maximum wall thickness [mm] | Total cycle time [s] | Part weight [g] | Amount of glass fibers [%] | Comparative Examples A-F Glass fiber read out | Examples 1-6 Glass fiber read out |
|---|---|---|---|---|---|---|---|
| Roof support end caps (Composition A and 1) [1] | <2; >0.8 | 4.0-4.5 | 60 | 205 | 30% | − | +++ |
| Cable holder (Composition B and 2) [1] | 4.5 | 4.5-5.0 | 65 | 260 | 50% | − | + |
| Chair frame (back) (Composition 1 and A) [1] | 2.6 | 30 | 154 | 1950 | 30% | − | ++ |
| Chair arm rest [2] (Composition A and 1) [1] | 4.3 | 2.5 | 206 | 550 | 30% | + | ++ |
| Chair frame (back) (Composition A and 1) [1] | >0.8 | 15-20 | | 780 | 30% | − | ++ |
| Engine cover (Composition C and 3) [1] | 3.7 | 4.0 | | 812 | 35% | + | +++ |

[1] Both materials were molded with the exact same processing conditions
[2] Gas injection technology

The invention claimed is:

1. A process for preparing an injection molded part, comprising the following steps:
   (a) providing a glass fiber reinforced semi-crystalline polyamide-6 composition comprised of a melt-blend of (i) glass reinforcement fibers, (ii) a base polyamide-6, and (iii) an amount of a low molecular weight polyamide oligomer sufficient to impart to the polyamide-6 composition a relative solution viscosity of less than 2.4 and a crystallization temperature under hyper DSC conditions of less than 168° C.;
   (b) heating the polyamide-6 composition to obtain a viscous liquid thereof;
   (c) filling a mold cavity with the viscous liquid to achieve a filled mold cavity with a filling time of at least 0.8 seconds;
   (d) leaving the viscous liquid in the mold cavity under pressure until the viscous liquid cools to form an injection molded part;
   (e) opening the mold; and
   (f) ejecting the injection molded part.

2. The process according to claim 1, wherein the injection molded part has a maximum wall thickness of at least 2.5 mm.

3. The process according to claim 1, wherein the polyamide-6 composition has a relative solution viscosity of less than 2.3.

4. The process according to claim 1, wherein the polyamide-6 composition has a relative solution viscosity of less than 2.2.

5. The process according to claim 1, wherein the polyamide-6 composition is a melt-blend of 80-99.5 wt % of the base polyamide-6 and 0.5-20 wt % of the low-molecular weight polyamide oligomer, wherein the total amount of the base polyamide-6 and the low-molecular weight polyamide oligomer is 100%.

6. The process according to claim 5, wherein the base polyamide-6 has a weight-average molecular weight of at least 10,000 g/mol and the low-molecular weight polyamide oligomer has a weight-average molecular weight of at most 5,000 g/mol.

7. The process according to claim 1, wherein the glass reinforcement fibers are present in the polyamide-6 composition in an amount of at least 10 wt %, based on the total weight of the polyamide-6 composition.

8. The process according to claim 1, wherein the glass reinforcement fibers are present in the polyamide-6 composition in an amount of at most 60 wt %, based on the total weight of the polyamide-6 composition.

9. The process according to claim 1, wherein the polyamide-6 composition further comprises a black polyaniline derivative.

10. The process according to claim 9, wherein the black polyaniline derivative is nigrosine.

11. The process according to claim 1, wherein the injection molded part has a maximum wall thickness of at least 3.0 mm.

12. The process according to claim 1, wherein the injection molded part has a maximum wall thickness of at least 3.5 mm.

13. The process according to claim 1, wherein the injection molded part has a maximum wall thickness of at least 4.0 mm.

14. The process according to claim 1, wherein the glass reinforcement fibers are present in the polyamide-6 composition in an amount of at least 20 wt %, based on the total weight of the polyamide-6 composition.

15. The process according to claim 1, wherein the glass reinforcement fibers are present in the polyamide-6 composition in an amount of at least 30 wt %, based on the total weight of the polyamide-6 composition.

16. The process according to claim 6, wherein the low molecular weight polyamide oligomer is a polyamide-66 (PA66) oligomer.

17. An injection molded part obtained by the process according to claim 1, wherein injection molded part has a weight which is at least 100 g per injection point.

18. An injection molded part having (a) a maximum wall thickness of at least 2.5 mm; and/or (b) a part weight of at least 100 g per injection point; wherein the injection molded part is formed of a glass fiber reinforced semi-crystalline polyamide-6 composition comprised of a melt-blend of (i) glass reinforcement fibers, (ii) a base polyamide-6, and (iii) an amount of a low molecular weight polyamide oligomer sufficient to impart to the polyamide-6 composition a relative solution viscosity of less than 2.4 and a crystallization temperature under hyper DSC conditions of less than 168° C.

* * * * *